(12) United States Patent  
Chou et al.

(10) Patent No.: US 8,484,328 B2
(45) Date of Patent: Jul. 9, 2013

(54) APPARATUS AND METHOD FOR STATEFUL WEB SERVICES ENABLEMENT

(75) Inventors: Wu Chou, Basking Ridge, NJ (US); Li Li, Bridgewater, NJ (US); Dan Zhuo, Richardson, TX (US); Feng Liu, Hillsborough, NJ (US)

(73) Assignee: Avaya Inc., Basking Ridge, NJ (US)

( * ) Notice: Subject to any disclaimer, the term of this patent is extended or adjusted under 35 U.S.C. 154(b) by 985 days.

(21) Appl. No.: 12/035,983

(22) Filed: Feb. 22, 2008

(65) Prior Publication Data

US 2008/0208972 A1 Aug. 28, 2008

Related U.S. Application Data

(60) Provisional application No. 60/902,874, filed on Feb. 23, 2007.

(51) Int. Cl.
*G06F 15/173* (2006.01)
(52) U.S. Cl.
USPC ............ 709/223; 709/224; 709/226; 370/352
(58) Field of Classification Search
USPC .................................. 709/223–226; 370/352
See application file for complete search history.

(56) References Cited

U.S. PATENT DOCUMENTS

| | | | | |
|---|---|---|---|---|
| 5,742,762 A * | 4/1998 | Scholl et al. | ................... | 709/200 |
| 6,792,605 B1 * | 9/2004 | Roberts et al. | ................. | 719/313 |
| 6,859,834 B1 * | 2/2005 | Arora et al. | .................... | 709/227 |
| 7,145,994 B2 * | 12/2006 | Moreau et al. | ............ | 379/114.01 |
| 7,225,261 B2 * | 5/2007 | Nishiguchi et al. | ............ | 709/227 |
| 7,581,006 B1 * | 8/2009 | Lara et al. | ..................... | 709/226 |
| 7,610,386 B1 * | 10/2009 | Martinez et al. | ............... | 709/227 |
| 7,620,934 B2 * | 11/2009 | Falter et al. | .................... | 717/106 |
| 7,672,680 B1 * | 3/2010 | Lee et al. | .................... | 455/456.5 |
| 8,369,326 B2 * | 2/2013 | Ansari et al. | .................... | 370/389 |
| 2002/0038362 A1 * | 3/2002 | Bhatia et al. | .................. | 709/224 |
| 2002/0052767 A1 * | 5/2002 | Yano | ................................. | 705/7 |
| 2002/0107915 A1 * | 8/2002 | Ally et al. | ..................... | 709/203 |
| 2003/0023957 A1 * | 1/2003 | Bau et al. | ...................... | 717/140 |

(Continued)

OTHER PUBLICATIONS

Two-way Web Service Router Gateway Feng Liu; Gesan Wang; Wu Chou; Fazal, L.; Li Li; Web Services, 2006. ICWS '06. International Conference on Digital Object Identifier: 10.1109/ICWS.2006.127 Publication Year: 2006 , pp. 629-636.*

(Continued)

*Primary Examiner* — Wing F Chan
*Assistant Examiner* — Razu Miah
(74) *Attorney, Agent, or Firm* — Muncy, Geissler, Olds & Lowe PLLC (57) ABSTRACT

A web services enablement system includes a computer adapted to send and receive information to and from a first service, to send and receive information to and from a second service, which may not be a web service, to manage a connection with a third, stateful, service and to send and receive information via the stateful service based on information received from the first service or the second service. Also a method of enabling two-way web services and stateful transactions that includes steps of providing an architecture of base services and meta-services, defining a first base service comprising a core component and an extension component, combining the first base service and a meta-service to create a first usable service, managing a relationship between the first usable service and a second service through dependency or binding or utility, and performing a stateful transaction using the first usable service.

21 Claims, 4 Drawing Sheets

U.S. PATENT DOCUMENTS

| | | | |
|---|---|---|---|
| 2003/0046411 A1* | 3/2003 | Nishiguchi et al. | 709/229 |
| 2003/0074395 A1* | 4/2003 | Eshghi et al. | 709/203 |
| 2003/0095540 A1* | 5/2003 | Mulligan et al. | 370/352 |
| 2003/0191834 A1* | 10/2003 | Steegmans | 709/224 |
| 2004/0111466 A1* | 6/2004 | Beringer et al. | 709/203 |
| 2005/0091370 A1* | 4/2005 | Wietfeld | 709/224 |
| 2005/0144137 A1* | 6/2005 | Kumar et al. | 705/55 |
| 2005/0160153 A1* | 7/2005 | Knutson et al. | 709/217 |
| 2005/0193124 A1 | 9/2005 | Chou et al. | |
| 2005/0198320 A1 | 9/2005 | Chou et al. | |
| 2006/0031476 A1* | 2/2006 | Mathes et al. | 709/224 |
| 2006/0041647 A1* | 2/2006 | Perham et al. | 709/220 |
| 2006/0069774 A1* | 3/2006 | Chen et al. | 709/225 |
| 2006/0143160 A1* | 6/2006 | Vayssiere | 707/3 |
| 2006/0230118 A1* | 10/2006 | Jwo | 709/213 |
| 2007/0067385 A1* | 3/2007 | D'Angelo et al. | 709/203 |
| 2007/0130312 A1* | 6/2007 | Shin et al. | 709/223 |
| 2007/0291650 A1* | 12/2007 | Ormazabal | 370/244 |
| 2008/0071642 A1* | 3/2008 | Leiba | 705/27 |
| 2009/0063193 A1* | 3/2009 | Barton et al. | 705/3 |
| 2009/0144112 A1* | 6/2009 | Eschenroeder | 705/7 |
| 2009/0164611 A1* | 6/2009 | Corda et al. | 709/222 |
| 2009/0204564 A1* | 8/2009 | Jung et al. | 706/55 |

OTHER PUBLICATIONS

Li Li, Wu Chou, Dan Zhuo and Feng Liu, 2SAP: A Flexible Architecture for Web Service Enablement of Communication Services, Proceedings of WEBIST'07, Mar. 2007.

Wu Chou, Li Li, and Feng Liu, "Web Service Enablement of Communication Services," Proceedings of the IEEE International Conference on Web Services (ICWS'05) 0-7695-2409-5/05 2005.

Paul Myrda, Mel Gehrs, Erich Gunther, Jerry Melcher, "EIPP Data Management Task Team Architecture," Proceedings of the 40th Hawaii International Conference on System Sciences—2007.

Li Li, Wu Chou, "Two-Way Web Service: From Interface Design to Interface Verification," Proceedings of the IEE International Conference on Web Services (ICWS'05) 2005.

* cited by examiner

Figure 10

APPARATUS AND METHOD FOR STATEFUL WEB SERVICES ENABLEMENT

CROSS-REFERENCE TO RELATED APPLICATIONS

The present application claims the benefit of U.S. Provisional Patent Application No. 60/902,874 filed Feb. 23, 2007, the entire contents of which are hereby incorporated by reference.

FIELD OF THE INVENTION

The present invention is directed to an apparatus and method for web service enablement of stateful services and, more specifically, toward an apparatus and method for web service enablement of communications services.

BACKGROUND OF THE INVENTION

Web services have gained tremendous momentum in recent years as an emerging disruptive technology with applications in various market sectors and fields. The fast adoption of web services reflects the current industrial paradigm shift from Object Oriented Architecture (OOA) to Service-Oriented Architecture (SOA) for business computing. It reinforces the significance and importance of web service technologies in creating reusable, reliable and scalable business services that are loosely coupled with physical implementations and agnostic to hardware devices, operating systems, transport protocols, programming models and languages.

One contributing factor to the success of web services is the maturity and proliferation of web service enablement packages and SOAP engines, such as Axis, and web service orchestration integration development environments (IDE) based on WS-business process execution language (BPEL). These web service packages collectively have made the development, testing and deployment of stateless, synchronous and one-way web services a relatively straightforward task when there is a clear boundary and separation between the client and server.

However, the use of web services to enable communication introduces many new technical challenges. In particular, telecommunication services typically exhibit some distinct characteristics such as generally requiring stateful transactions. Telecommunication services are stateful in two ways. First, it is usually necessary to establish a session association among clients and service providers before any subsequent message exchange can happen. Second, the message exchanges in communication often involve many stateful resources. Another characteristic of telecommunication services is two-way message exchange. In telecommunication services, the role of client and server can be reversed such that a client can also act as a server during the interaction.

Telecommunication services also exhibit asynchrony. Asynchronous messages arise because of scalability issues and the event-driven nature of communication services. Telecommunications also involve conversational interaction patterns; the message exchange patterns between a client server are highly conversational in the sense that the client and server repeatedly exchange messages back and forth in order to reach a goal. Real-time factors are also involved because message interactions must generally occur in real-time to satisfy Quality of Service (QoS) requirements for certain communication services. Reliability is also generally more critical in telecommunications services than in some other services because undelivered, delayed, out-of-order or duplicated messages may put a system into an incorrect state.

To address these issues, one needs to work with the current web service technologies and protocol standards in order to achieve interoperable solutions between services and platforms. The relationship between services is complex. For example, a communication service may depend on several other web services, which in turn may depend on each other. Without a generic framework, the cost of web service enablement would likely become prohibitive. It would therefore be desirable to provide a method and apparatus for web service enablement of communication and other stateful services that addresses the above and other limitations of current web services and web services enablement packages.

SUMMARY OF THE INVENTION

These problems and others are addressed by embodiments of the present invention, a first aspect of which comprises a web services enablement system for two-way web services and stateful transactions that includes a computer adapted to send and receive information to and from a first service, to send and receive information to and from a second service, to manage a connection with a third service comprising a stateful service and to send and receive information via the stateful service based on information received from the first service or the second service.

Another aspect of the invention comprises a web services enablement system for two-way web services and stateful transactions comprising a computer readable recording medium containing instructions for causing a computer to send and receive information to and from a first service, to send and receive information to and from a second service, to manage a connection with a stateful service and to send and receive information via the stateful service based on information received from the first service or the second service.

A further aspect of the present invention comprises a method of enabling two-way web services and stateful transactions that includes steps of providing an architecture of base services and meta-services, defining a first base service comprising a core component and an extension component, combining the first base service and a meta-service to create a first usable service, managing a relationship between the first usable service and a second service through dependency or binding or utility, and performing a stateful transaction using the first usable service.

BRIEF DESCRIPTION OF THE DRAWINGS

These and other benefits of the invention will be better understood after a reading of the following detailed description in connection with the attached drawings wherein.

DETAILED DESCRIPTION

A detailed description of embodiments of the present invention is provided herein with reference to the accompanying drawings. The drawings are provided for illustration only and are in no way intended to limit the present invention.

Motivated by the abovementioned issues, the present inventors have developed a web service enablement framework that will be referred to herein as a "two-way web service application proxy" or TWWSAP. The TWWSAP framework has been successfully applied to enable several enterprise communication services, including CSTA services (e.g., ECMA-348, ECMA-366, etc.) and Conference services. The communication web services enabled by TWWSAP encapsulate the complexities of telecommunication protocols. This allows programmers and application developers without special training in the field to integrate telecommunication services into various enterprise business applications as a gateway between web service clients and backend services that may or may not be web services based.

Figure 1:
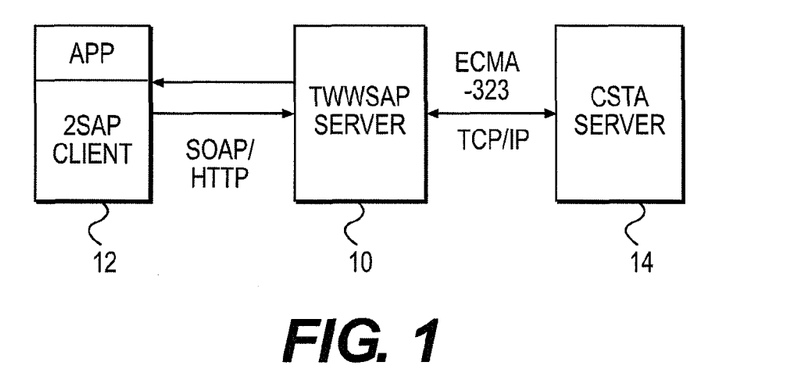
FIG. 1 schematically illustrates a first use of a two way web services application proxy according to an embodiment of the present invention.
Figure 2:
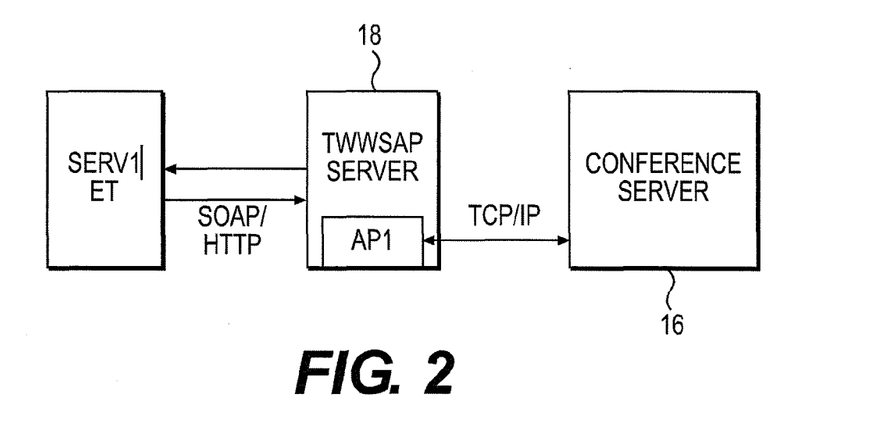
FIG. 2 schematically illustrates a second use of a two way web services application proxy according to an embodiment of the present invention.
Figure 3:
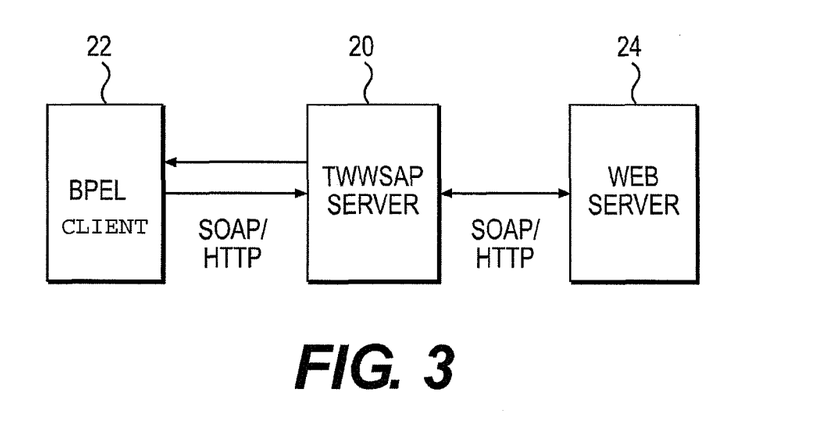
FIG. 3 schematically illustrates a third use of a two way web services application proxy according to an embodiment of the present invention.

In general, backend services can be categorized as either message based system or API based service platform component. FIGS. 1, 2 and 3 illustrate some typical use cases of TWWSAP in practical scenarios. In FIG. 1, a TWWSAP server 10 provides both client functions 12 and middleware to access the backend CSTA server 14. It provides support for ECMA-323 XML messages over TCP/IP. The TWWSAP server 10 needs to translate two-way messages between ECMA-348, which is based on web services (WSDL), and ECMA-323, which is a non-web service XML protocol. This is in addition to managing the session and event subscription services for the backend server 14.

FIG. 2 illustrates a conference server 16 providing a Java SDK for service access. The SDK provides session and listener Java objects to access session and event managements respectively. Here, a TWWSAP server 18 needs to translate between SOAP messages and Java objects and map session and web services for events into SDK logic and API.

FIG. 3 illustrates a TWWSAP server 20 acting as a SOAP broker between a BPEL client 22 and a group of backend web services 24. Here TWWSAP server 20 manages session and event services on behalf of the backend services 24 and performs content-based routing. In these cases, because the complexities of managing two-way, stateful, and asynchronous web service interactions are encapsulated in the TWWSAP servers, backend services can focus on their business logic.

One important issue is how to expose the integrated service descriptions to the web service clients using standard web services description language (WSDL) definitions in a cohesive and flexible way. The way the services are synthesized determines how they should be accessed by the clients and how they can be implemented and maintained by the providers. TWWSAP is based on the concept and architecture of base services and meta-services: base services that provide specific functions in a particular domain, and meta-services that enforce rules for certain common aspects, such as session, event subscription, security, etc., of the base services. Without a base service, a meta-service has no effect on the real world. For example, WS-Session services must be combined with some base services to create fully functional services. On the other hand, meta-services are independent of base services and they can be synthesized with different and even multiple base services to create a variety of different services.

Given a WSDL description of a base service, certain factors should be addressed when integrating meta-services with the base services. These include the semantic relations between services, the lifecycle dependency of services, modularity of services, and transport binding control of services. In WSDL 1.1 and WSDL 2.0 frameworks, for example, there are three options to incorporate meta-services into a base service, i.e. interface, port and service. In an interface based approach, the appropriate portType or interface of the base service is extended to include the meta-service operations. Semantically, the base service "inherits" the meta-service. (WSDL 1.1 does not actually support portType inheritance and the operations have to be copied over). This approach ensures that the base and the meta-services have the same lifecycle. However, modularity of services is sacrificed in WSDL 1.1.

Multiple inheritance mechanisms in WSDL 2.0 promote modularity but may introduce common problems in inheritance such as operation conflicts. As base services and meta-services converge at the interface level, they will be bound to the same transport and accessed on a single endpoint.

In a port-based approach, the port for the meta-services is added to the ports of the base service. Semantically, the base service aggregates the meta-service. This is consistent with WSDL 1.1 view that a service definition groups related ports (endpoints). This is also a common practice in the Internet, where related protocols run on different transport ports (for example RTP and RTCP). The base service and meta-service may or may not have the same lifecycle, depending on whether they are bound to the same endpoint. It is possible for several base services to share a meta-service. As this approach does not require any modifications to the service interface of the base service, interface modularity is therefore maintained. Port based approach allows base services and meta-services to use different transports, for example JMS for reliable event subscription and UDP for fast event delivery.

In a service based approach, a meta-service is defined as a new service in the base service WSDL file. Semantically, the base and meta-services are coordinated by the fact that service definitions have the same target namespace. The base service and meta-service may or may not have the same lifecycle, depending on whether they are bound to the same endpoint. It is possible for several base services to share a meta-service. This approach requires few changes to the base service WSDL. In addition, different transport bindings can be used for base services and meta-services.

In the described TWWSAP approach, there are three types of relationship between services and protocols, namely dependency, binding and utility. A Service X is said to depend on service Y if the specification of Service X references XML definitions from Service Y. For instance, WS-Eventing references WS-Addressing definitions. Binding maps an abstract service or protocol to a concrete protocol. For instance, all services bind to SOAP. In utility, Service X uses resources maintained by Service Y at runtime. For example, ECMA-348 services use event subscriptions created by WS-Eventing and sessions created by WS-Session. In addition, ECMA-348 can create its own monitor resources and store them in a session resource managed by WS-Session. WS-Eventing can also use WS-Session when a client subscribes to events in the sessions created by WS-Session. On the other hand, WS-Session uses subscriptions of WS-Eventing to deliver session events. Base services may also use Generic Event Sink service to receive the subscribed CSTA events (ECMA TR-90 2005).

Figure 4:
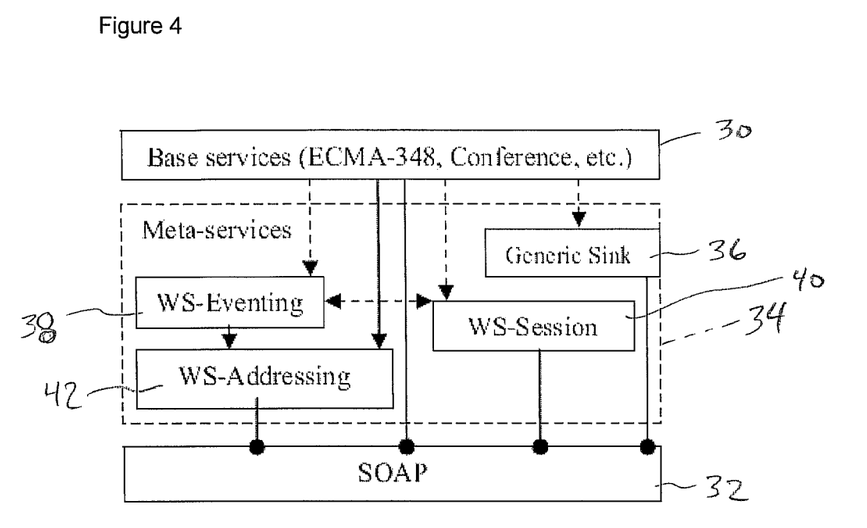
FIG. 4 schematically illustrates bindings and relationships between a base service, various meta-services and SOAP supported by the web services application proxy of the present invention.

FIG. 4 illustrates the relationships among some services that TWWSAP supports, where dependency is represented by solid arrows, binding by solid lollipops, and utility by dashed arrows. As illustrated in that figure, base services 30, such as ECMA-348, conference, etc. bind to SOAP layer 32. A plurality of meta-services 34 are also illustrated, including a generic sink 36, WS-Eventing 38, WS-Session 40 and WS-Addressing 42. WS-Addressing 42, WS-Session 40 and generic sink 36 each bind to SOAP layer 32, while WS-Eventing 38 utilizes WS-Addressing 42 and the base services 30 utilize each of WS-Eventing 38, WS-Session 40 and generic sink 36.

To realize these relationships at runtime, services must be allowed to interact with each other at two levels: the resource level and the message level. At resource level, a service needs to access the resources created by another service or create certain relationship between resources across services. In this case, the service can be modeled as a "factory" that manages the lifecycle and persistence of its resources and exposes them through well-defined application programming interfaces (APIs). At the message level, a service may need to access or change the messages as well as call flows of another service. For example, the ECMA-348 service must analyze WS-Eventing subscribe messages to determine whether a session is the target of a subscription. If so, a link between the subscription and session must be established. Otherwise, it must throw a fault message.

To permit this kind of interaction, it is useful for the service to be defined with its core logic separate from various extensions so that the extensions can be manipulated while the core is protected. This also allows the core logic to be reused and invoked from different contexts. For extensions, the Interceptor design pattern is a flexible choice because it leaves the client, service and the interceptors loosely coupled and fits well with current SOAP framework.

To modularize the meta-service implementation in TWWSAP, each service can be thought of as having two two-value dimensions: stateless vs. stateful, and core vs. extension. The stateless component is involved in the processing of messages in stateful interactions but relies on the stateful component for managing stateful resources. In TWWSAP, it made the processing of service messages stateless, while making the resources that are used in the processing stateful to manage stateful interaction. In particular, the stateful component provides local and remote access APIs to manage subscriptions and sessions as time-based leases. The core component implements the mandatory logic of the service and leaves the extension part to the integration interceptors.

Figure 5:
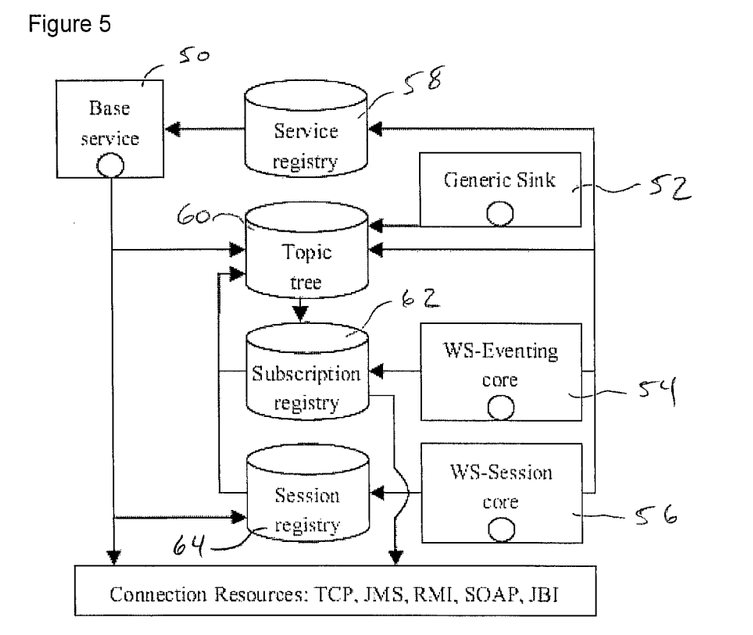
FIG. 5 schematically illustrates the architecture of the web services application proxy of the present invention.

The main components of TWWSAP architecture are illustrated in FIG. 5 where stateless components, including base service 50, generic sink 52, WS-Eventing core 54 and WS-Session core 56 are shown as rectangles and stateful components, such as service registry 58, topic tree 60 (discussed hereafter), subscription registry 62 and session registry 64 are shown as disks. An arrowed line indicates the dependency between components and a circle indicates that the particular service provides hooks for interceptors.

Figure 6:
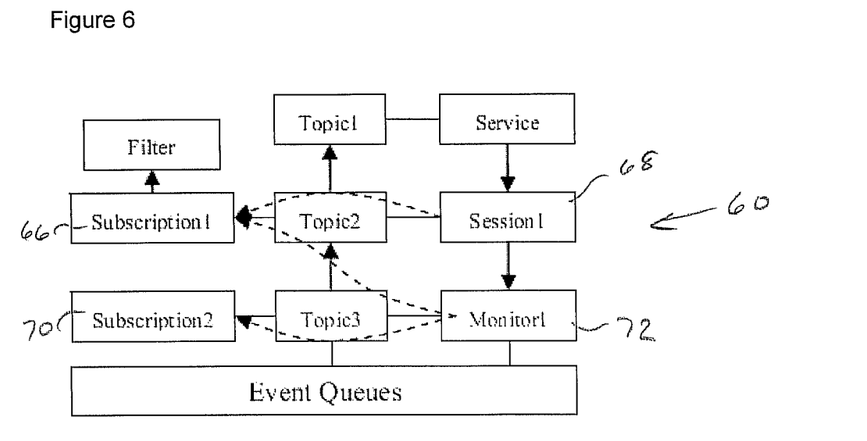
FIG. 6 schematically illustrates the topic tree of FIG. 5.

To reduce or eliminate the dependency between event subscription and diverse event sources, a topic tree data model is introduced to facilitate creation of hierarchical event topics. The topic tree abstracts resources from various services into a uniform topic hierarchy with event propagation rules. Such abstraction enables a client to subscribe to a group of event sources which may not exist yet. FIG. 6 illustrates a typical topic tree 60 created for ECMA-348 services when one subscription 66 is created for a session 68 and a second subscription 70 is created for a monitor 72 within the session. The dotted arrows indicate the possible paths of event propagation. In this topic tree, if first session 68 terminates, first subscription 66 will receive the event notification. Events from Monitor 172 will also propagate to both first subscription 66 and second subscription 70 along the topics, if event bubbling is enabled. In this manner, the topics can be selected independently of the event sources that they describe.

Figure 7:
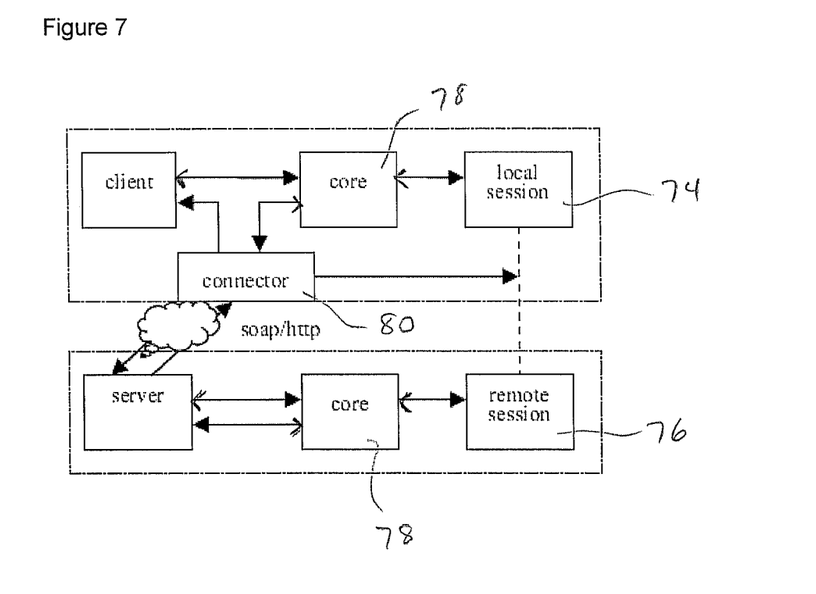
FIG. 7 schematically illustrates a message flow in a remote session and local session using the same core component.

The core of services provides well-defined interfaces so that they can be invoked either from a SOAP engine or directly by a client. Combined with interceptors, the same logic can be used to create virtual resources that span client and server. FIG. 7 illustrates the message flow of WS-Session StartApplicationSession that creates an association consisting of a local session 74 and a remote session 76 using the same core component 78 intercepted by a connector 80. This association can be shared by many clients and servers, as defined by WS-Session. To allow changes for the extension while protecting the core logic of a service, the integration interceptors can read the messages directly and change the messages indirectly using message context.

For example, two integration interceptors, one from WS-Session, the other one from ECMA-348, intercept WS-Eventing event subscription message and create topics for session and monitor services respectively as shown in FIG. 6. In case of Generic Event Sink service, interceptors act as event listeners that handle incoming events and dispatch them to proper topics. As a result, both WS-Eventing and Generic Event Sink core components are agnostic to any service specific logic and resources. Without sharing, it would appear that N interacting services would result in N(N-1) integration interceptors. Fortunately this is not the case because some services can share an interceptor with common behavior. For example, ECMA-348 and WS-Eventing services share a session interceptor that retrieves a session object of WS-Session from the session registry according to the session ID provided in the SOAP message. The following subsections illustrate several typical scenarios that TWWSAP meta-services are integrated with base services.

Figure 8:
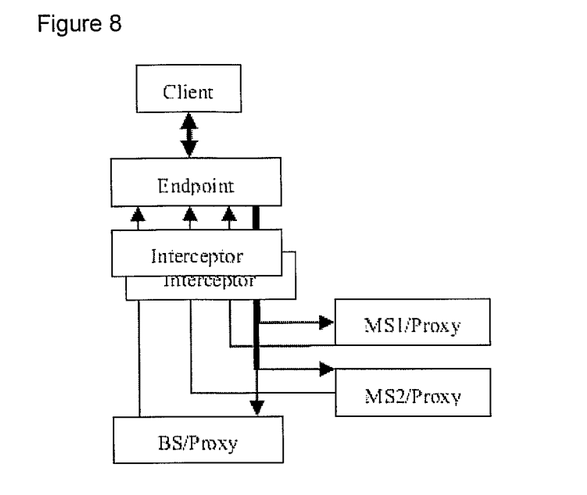
FIG. 8 illustrates a first method of integrating meta-services with base services according to an embodiment of the present invention.
Figure 9:
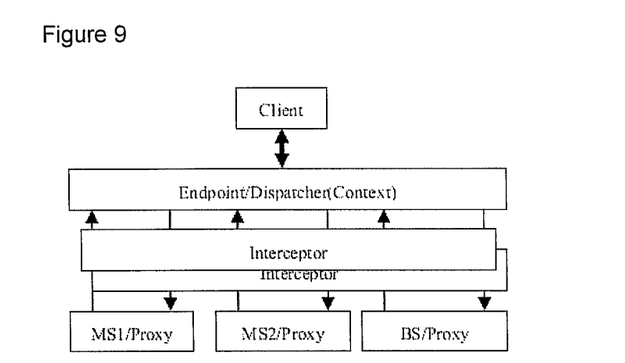
FIG. 9 illustrates a second method of integrating meta-services with base services according to an embodiment of the present invention.

In the collocated case illustrated in FIGS. 8 and 9, all services are deployed at one endpoint for inheritance based integration. To implement this configuration with SOAP engines that permit only one service object per endpoint, the meta-services (MS) can be implemented as interceptors of the base service (BS). Each meta-service module has to demultiplex incoming messages (FIG. 8). For example, a WS-Session interceptor will only handle its messages and skip the others.

While this approach is highly modular and configurable, it has some drawbacks. First, sequential message dispatching is suboptimal. Second, meta-services have to cope with unchecked raw SOAP messages instead of well-formed objects deserialized by the SOAP engine. To overcome these limitations while maintaining the benefits, a dispatcher is employed in TWWSAP to associate an endpoint with multiple service objects, using a routing table which is configurable at deployment and runtime. To allow services and interceptors to exchange information, a context is maintained by the dispatcher and shared across message flows (FIG. 9).

Figure 10:
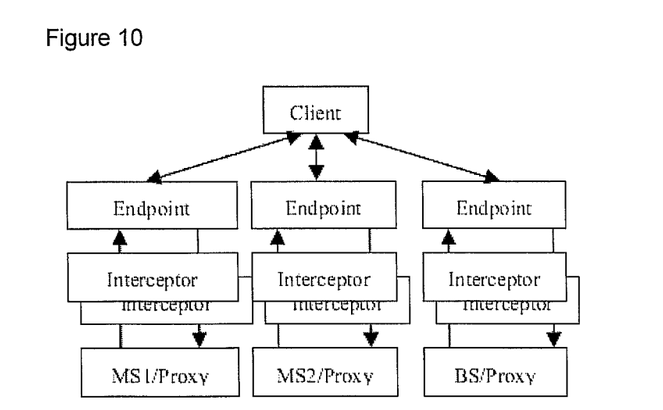
FIG. 10 illustrates a third method of integrating meta-services with base services according to an embodiment of the present invention.

In both configurations, the meta-services and base services can be distributed to different hosts by using proxies. The architecture in FIG. 9 is particularly suitable for content-based message routing. This architecture supports various distributed event broker architectures, e.g., in FIG. 10, services are deployed at different endpoints, possibly on different machines, using port or service based description integration To reduce location coupling in this situation, TWWSAP can dynamically provision a registered base service according to the access control and return the base service endpoint to the client when a session is established.

The modularization and abstraction of meta-services and its resources in TWWSAP creates various benefits. For example, each service is self-contained and can be implemented independently even though it may depend on other services. In addition, the stateless and stateful components of a service can be collocated or distributed to provide flexible architecture. Also, the topic tree, factory pattern and integration interceptors support asynchronous event management and allow services to be integrated while being loosely coupled. This arrangement also allows for reusable core components to facilitate development of TWWSAP client and server services for peer-to-peer web services. The three service description integration options (inheritance, aggregation and coordination) can be supported with collocated and distributed services which provide design freedom in scalable service enablement and integration.

The architecture and techniques developed in TWWSAP have been applied to web service enablement of some back-end communication services, including ECMA-348 service, real-time multimedia conference services, call center and dialog system services, and integrated with standard based SOA framework of JBI (Java Business Integration) service bus. They have also been applied to web services to enable communication endpoints. The performance of TWWSAP architecture is satisfactory for communication requirements in that end-to-end signal delay is within 300 milliseconds (ms). In recent experiments, it has been observed that the average processing time per message for meta-services is within 20 ms while the average roundtrip time of meta-service message is about 60 ms, which includes local network transport time and SOAP engine (Axis 2006) processing time. The measurements were obtained on laptop computers with 1.6 GHz CPU and 512 MB memory, running Windows XP professional.

Benefits of the above-described system are apparent from the Communications Process Manger (CPM) system of Avaya, Inc. which uses the above-described TWWSAP to implement many of the above approaches to web service enablement. TWWSAP monitors data streams, related to inventory or manufacturing data, for example, and then establishes communication sessions with predetermined individuals when a given event occurs. For example, an event could be defined as "inventory of product X falls below level Y." With existing systems, this event might go unnoticed for hours or days until a person at location Y reported that product Y was sold out or an audit of inventory levels revealed the depleted inventory at location Y.

With the above described system, however, the TWWSAP server can initiate sessions to telephone predefined individuals and/or schedule a conference as soon as the event occurs. Individuals can be contacted by telephone, email and/or SMS to ensure they are available to participate in a decision process. This allows the necessary persons to obtain a decision in minutes rather than hours or days on how to respond to the inventory situation. After the call or conference is established, the contacted individual can send commands via the TWWSAP server to address the detected situation. For example, a message could be sent to a supplier to order more of product x, or the inventory of product x at other locations could be checked to determine whether extra inventory is available to move to location Y. By providing web service enablement for telecommunication services, the decision making abilities of humans can be combined with the real-time monitoring of events that require human intervention to reduce human latency and adjust business processes to evolving conditions.

The present invention has been described herein in terms of several embodiments. However, obvious additions and modifications to these embodiments will become apparent to those of ordinary skill in the relevant arts upon a reading of the foregoing description. It is intended that all such obvious modifications and additions comprise a part of the present invention to the extent they fall within the scope of the several claims appended hereto.

What is claimed is:

1. A web services enablement system for two-way web services and stateful transactions comprising: a computer adapted to send and receive information to and from a first service, to send and receive information to and from a second service, to manage a connection with a third service comprising a stateful telecommunication service and to send and receive information via the stateful telecommunication service based on information received from the first service or the second service, wherein said computer enables a user to define available services in terms of meta-services and base services and wherein said base services provide specific functions of a particular domain and said meta-services enforce rules for certain common aspects of the base services.

2. The web services enablement system of claim 1 wherein said meta-services are independent of said base services and can be combined with different ones of said base services to define different usable services.

3. The web services enablement system of claim 1 wherein the available services are related through the structure of dependency, binding and utility.

4. The web services enablement system of claim 1 wherein said base services comprise a service core and a service extension, said service core being protected and said service extension being changeable.

5. The web services enablement system of claim 1 wherein said stateful telecommunication service is managed by making the processing of service messages stateless and making the resources used in the processing of service messages stateful.

6. The web services enablement system of claim 1 including a topic tree abstracting resources from multiple available services into a topic hierarchy having event propagation rules.

7. The web services enablement system of claim 1 wherein said computer:
   performs enablement of available services by an architecture of base services and meta-services abstraction and interaction;
   enables available services with a mechanism and a two-dimensional hierarchy of core/extension and stateless/stateful;
   manages relationships between available services through dependency, binding and utility; and
   utilizes a topic tree sharing architecture to abstract resources.

8. The web services enablement system of claim 1, wherein said third service comprises a session-based service.

9. The web services enablement system of claim 1, wherein the stateful telecommunication service comprises a telephone call to a telecommunications device.

10. A web services enablement system for two-way web services and stateful transactions comprising: a non-transitory computer readable recording medium containing instructions for causing a computer to send and receive information to and from a first service, to send and receive information to and from a second service, to manage a connection with a stateful telecommunication service and to send and receive information via the stateful telecommunication service based on information received from the first service or the second service, wherein said instructions enable a user to define available services in terms of meta-services and base services and wherein said base services provide specific functions of a particular domain and said meta-services enforce rules for certain common aspects of the base services.

11. The web services enablement system of claim 10 wherein said meta-services are independent of said base services and can be combined with different ones of said base services to define different usable services.

12. The web services enablement system of claim 10 wherein the available services are related through the structure of dependency, binding and utility.

13. The web services enablement system of claim 10 wherein said base services comprise a service core and a service extension, said service core being protected and said service extension being changeable.

14. The web services enablement system of claim 10 wherein said instructions enable the stateful telecommunication service to be managed by making the processing of service messages stateless and making the resources used in the processing of service messages stateful.

15. The web services enablement system of claim 10 wherein said instructions cause a computer to define a topic tree abstracting resources from multiple available services into a topic hierarchy having event propagation rules.

16. The web services enablement system of claim 10 wherein said computer readable medium includes instructions for causing a computer to:

perform enablement of available services by an architecture of base services and meta-services abstraction and interaction;

enable base services with a mechanism and two-dimensional hierarchy of core/extension and stateless/stateful;

manage relationships between available services through dependency, binding and utility; and utilize a topic tree sharing architecture to abstract resources.

17. The web services enablement system of claim 10, wherein said stateful telecommunication service comprises a session-based service.

18. The web services enablement system of claim 10, wherein the stateful telecommunication service comprises a telephone call to a telecommunications device.

19. A method of enabling two-way web services and stateful telecommunication transactions comprising the steps of:

defining a first base service comprising a core component and an extension component;

combining the first base service and a meta-service to create a first usable service;

managing a relationship between the first usable service and a second service through dependency or binding or utility;

performing a stateful telecommunication transaction using the first usable service, and including the additional step of providing a topic tree sharing architecture abstracting resources from various available services into a uniform topic hierarchy having event propagation rules.

20. The method of claim 19, wherein said stateful telecommunication transaction comprise establishing a telecommunication session among at least two clients.

21. The method of claim 19, wherein performing a stateful telecommunication transaction comprises placing a telephone call.

* * * * *